(12) United States Patent
Graham

(10) Patent No.: US 7,008,005 B1
(45) Date of Patent: Mar. 7, 2006

(54) DEVICE FOR REDUCING VEHICLE AERODYNAMIC RESISTANCE

(75) Inventor: Sean C. Graham, Seattle, WA (US)

(73) Assignee: Freight Wing Inc., Seattle, WA (US)

( * ) Notice: Subject to any disclaimer, the term of this patent is extended or adjusted under 35 U.S.C. 154(b) by 0 days.

(21) Appl. No.: 10/934,055

(22) Filed: Sep. 7, 2004

(51) Int. Cl.
*B62D 35/00* (2006.01)

(52) U.S. Cl. ............................... 296/180.4; 296/181.5

(58) Field of Classification Search ............. 296/180.1, 296/180.4, 180.5, 181.5, 182.1; 105/396, 105/410, 402
See application file for complete search history.

(56) References Cited

U.S. PATENT DOCUMENTS

| | | | |
|---|---|---|---|
| 2,514,695 A | 7/1950 | Dempsey | 296/208 |
| 3,415,566 A | 12/1968 | Kerrigan | 296/1 |
| 3,934,922 A | 1/1976 | MacCready | 296/180.4 |
| 3,960,402 A * | 6/1976 | Keck | 296/180.4 |
| 3,971,586 A | 7/1976 | Saunders | 296/180.4 |
| 3,999,797 A | 12/1976 | Kirsch | 296/180.4 |
| 4,021,069 A | 5/1977 | Hersh | 296/180.4 |
| 4,022,508 A | 5/1977 | Kirsch | 296/180.4 |
| 4,030,779 A | 6/1977 | Johnson | 296/180.4 |
| 4,098,534 A | 7/1978 | Wood | 296/180.4 |
| 4,103,957 A | 8/1978 | Landry | 296/180.4 |
| 4,135,754 A | 1/1979 | FitzGerald | 296/15 |
| 4,210,354 A | 7/1980 | Canning | 296/180.4 |
| 4,311,334 A * | 1/1982 | Jenkins | 296/180.4 |
| 4,318,566 A | 3/1982 | Fitzjarrell | 296/180.4 |
| 4,360,232 A * | 11/1982 | Elder | 296/180.4 |
| 4,560,195 A | 12/1985 | Price | 296/180.4 |
| 5,190,342 A | 3/1993 | Marlowe | 296/180.2 |
| 5,332,280 A * | 7/1994 | DuPont et al. | 296/180.1 |
| 5,685,597 A * | 11/1997 | Reid | 296/180.1 |
| 6,585,312 B1 | 7/2003 | Jain | 296/180.1 |
| 6,666,498 B1 * | 12/2003 | Whitten | 296/180.4 |

* cited by examiner

Primary Examiner—Patricia L. Engle

(57) ABSTRACT

A device for reducing vehicle aerodynamic resistance for vehicles having a generally rectangular flat front face comprising a plurality of load bearing struts of a predetermined size attached to the flat front face adjacent the sides and top thereof, a pair of pliable opposing flat sheets having an outside edge portion attached to the flat front face adjacent the sides thereof and an upper edge with a predetermined curve; the opposing flat sheets being bent and attached to the struts to form effective curved airfoil shapes, and a top pliable flat sheet disposed adjacent the top of the flat front face and having predetermined curved side edges, which, when the top sheet is bent and attached to the struts to form an effective curved airfoil shape, mate with the curved upper edges of the opposing sheets to complete the aerodynamic device.

12 Claims, 6 Drawing Sheets

DEVICE FOR REDUCING VEHICLE AERODYNAMIC RESISTANCE

This invention was made with Government support under Contract No. DE-FC36-03G013173 awarded by the Department of Energy. The Government has certain rights in this invention.

TECHNICAL FIELD

The invention relates to a device for reducing the aerodynamic resistance of a moving, rectangular shaped vehicle and more particularly to a set of three airfoils that are mounted on the front face of the vehicle.

BACKGROUND ART

It is well known that streamlining the front of a vehicle such as a trailer truck will reduce the aerodynamic resistance of a moving vehicle and thus save fuel. However, streamlining the front of a rectangular vehicle such as a semi trailer is impractical because the cargo space inside is decreased. Consequently, removable attachments are frequently employed to streamline the front face of rectangular vehicles. However, past designs for removable attachments are typically large and heavy one piece structures, which are difficult to transport when not mounted on the trailer, difficult to mount, incompatible with different trailer geometries, must be wholly replaced if damaged in one area, and do not provide the maximum drag decrease possible. The device described herein uses a minimal amount of material resulting in reduced weight and production costs and provides a maximized drag reduction. It is easily packaged and shipped, and can be easily mounted on the forward face of trailers with different geometries without modification, and damaged areas can be easily repaired with replacement parts.

DISCLOSURE OF THE INVENTION

In general, a device for reducing vehicle aerodynamic resistance disposed on the front of a movable vehicle with a generally flat front face, when made in accordance with this invention, comprises a plurality of load bearing struts of a predetermined size fastened to the flat front face adjacent the sides and top thereof. A pair of opposing sheets of flat pliable material each of which have an outside edge portion that is attached to opposite sides of the flat front face, an inside edge portion attached to adjacent struts and a predetermined curved upper edge. A single top sheet of flat pliable material with predetermined curved side edges, an inside edge portion attached to adjacent struts and a top outside edge portion disposed generally parallel to and adjacent the top of the flat front face. A plurality of clips fastening and mating the curved upper edges of the opposing sheets to the curved side edges of the top sheet so that the opposing sheets and the top sheet bend into effective curved airfoil shapes to reduce the aerodynamic resistance of the moving vehicle.

BRIEF DESCRIPTION OF THE DRAWINGS

The invention as set forth in the claims will become more apparent by reading the following detailed description in conjunction with the accompanying drawings, wherein like reference numerals refer to like parts throughout the drawings and in which:

BEST MODE FOR CARRYING OUT THE INVENTION

Figure 1:
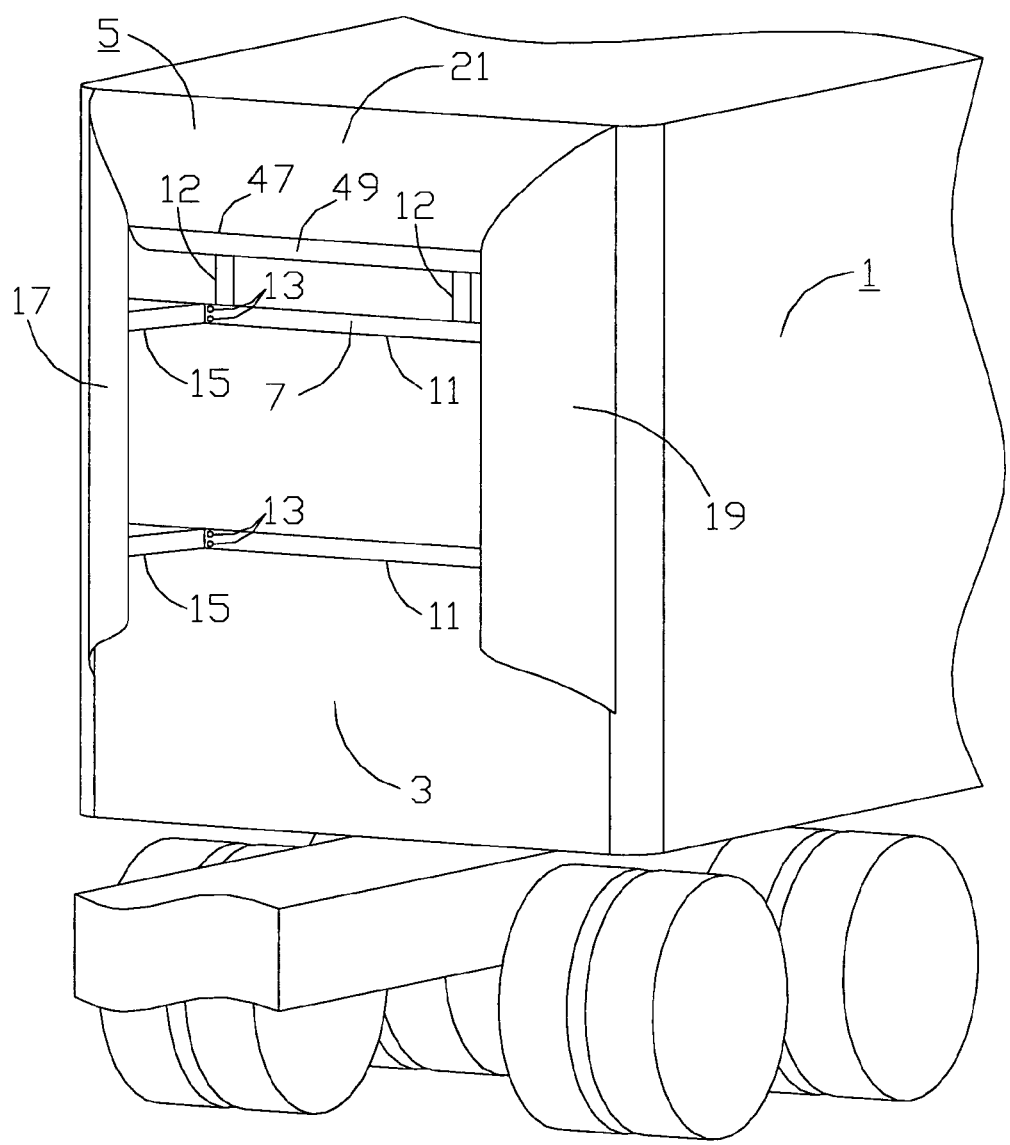
FIG. 1 is an isometric view of a vehicle with a rectangular flat front face with effective airfoils made in accordance with this invention disposed thereon.

Referring now to the drawings in detail and in particular to FIG. 1, there is shown a vehicle 1 such as a trailer truck, having a generally rectangular flat front face 3 and an effective airfoil device 5 for reducing the aerodynamic resistance of the vehicle 1 when it moves fastened to the flat front face 3. The device 5 comprises a frame 7 having a plurality of parallel cross members 11 and a plurality of vertical cross members 12. The parallel cross members 11 are fastened to the flat front face 3 by rivets 13 or other fastening means. Load bearing struts 15 are fastened to the parallel cross members 11 and vertical cross members 12. Opposing flat sheets 17 and 19 of pliable material are fastened to the frame 7 and bent to form curved airfoil shapes and fastened to the load bearing struts 15 to form the sides of the effective airfoil device 5. A top flat sheet 21 of pliable material is fastened to the frame 7 and bent to form a curved airfoil shape and fastened to load bearing struts 15 and the bent opposed flat sheets 17 and 19 to form the top portion of the effective airfoil device 5. The top flat sheet 21 has a bottom edge 47 that is bent to form an angled flap 49.

Figure 2:
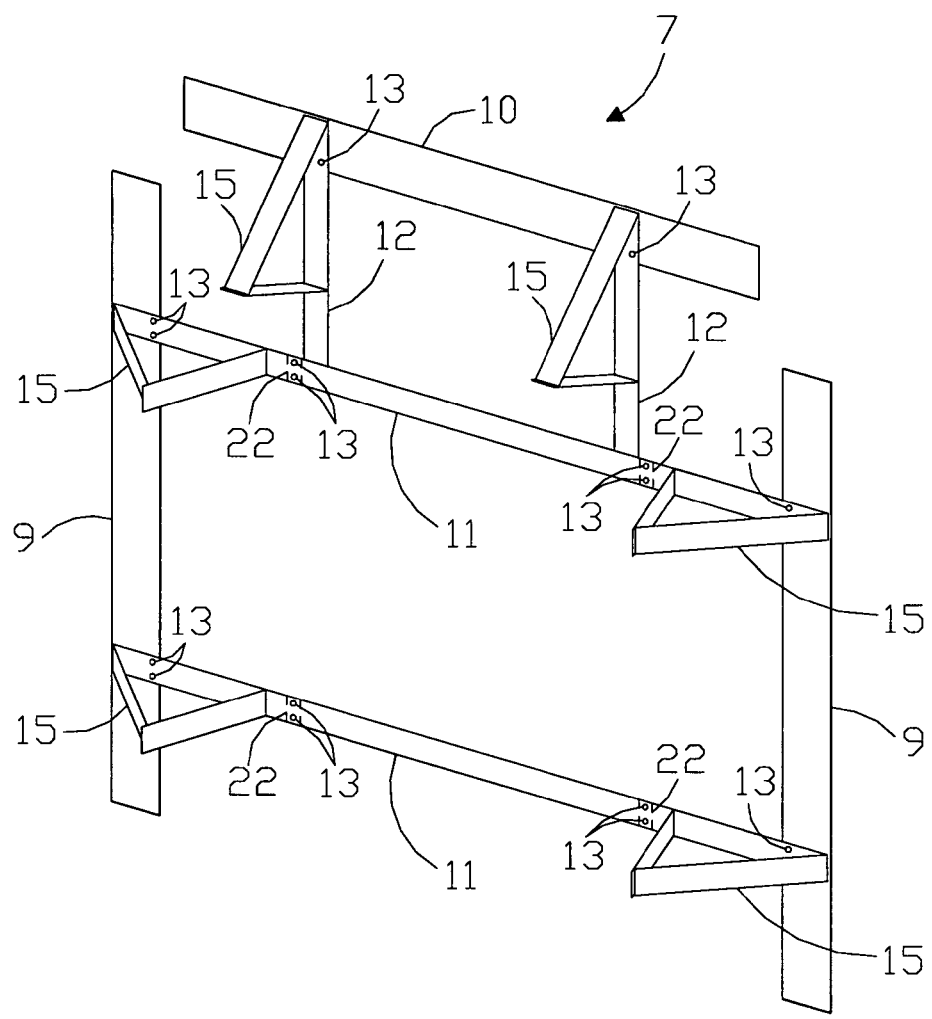
FIG. 2 is an isometric view of a frame with load bearing struts to which the opposing airfoils and top airfoil are fastened.

FIG. 2 shows the frame 7 without the flat sheets 17, 19 and 21 and comprises a pair of parallel side members 9 that are disposed adjacent opposite sides of the flat front face of the vehicle and the plurality of parallel cross members 11 extending between the parallel side members 9 and fastened there to by rivets 13 or other fastening means. Spacers 22 are disposed between the parallel cross members 11 and the flat front face 3 allowing the parallel cross members 11 to be fastened to the flat front face 3 by rivets 13 or other fastening means. The parallel side members 9 are preferably not fastened to the flat front face 3, but could be. Vertical cross members 12 extend between the parallel cross members 11 and the top member 10 that is disposed adjacent the top of the flat front face 3. The load bearing struts 15 having a predetermined dimension are designed to carry loads from different directions. They are shown fabricated from strips of flat sheets bent to form a triangle and are fastened to the parallel cross members 11 and the vertical cross members 12. The frame 7 and struts 15 cooperate to establish accurate dimensions, which allow field assembly and provide the precision necessary to produce the effective curved airfoil shapes formed from opposing flat sheets 17 and 19 and top flat sheet 21 of pliable material such as aluminum shown in FIG. 1.

Figure 3:
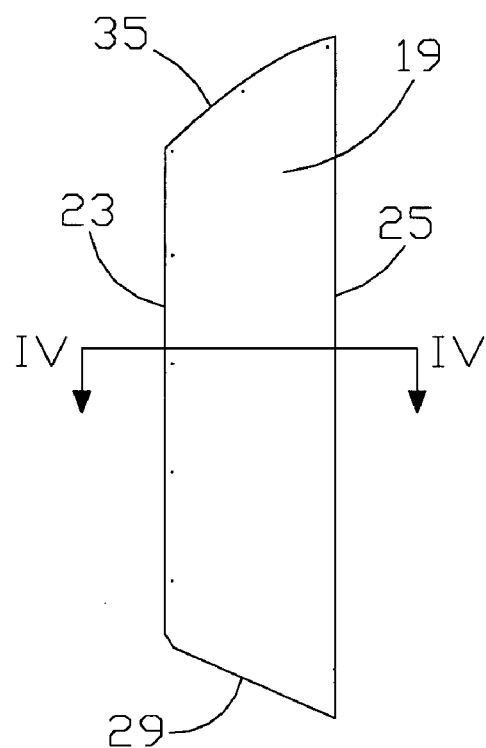
FIG. 3 is an elevational view of an opposing flat sheet prior to being bent to form an effective curved airfoil.
Figure 4:
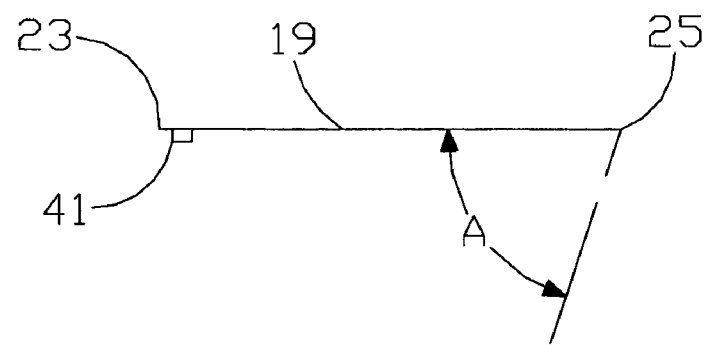
FIG. 4 is a sectional view taken on line IV—IV of FIG. 3.

FIGS. 3 and 4 show the opposing flat sheet 19 of pliable material before being bent to form an effective curved airfoil. The opposing flat sheet 19 has an outside edge portion 25, bent to form an angle A to facilitate fastening the opposing flat sheet 19 to the parallel side member 9 of the frame 7. The angle A is generally about 72°. The opposing flat sheet 19 is preferably not fastened to the cross members 11, but could be. The opposing flat sheet 19 has an essentially straight lower edge 29, angled upwardly, and an upper edge 35, with a predetermined curve. Inside edge portion 23 is stiffened by a stiffener member 41 or other stiffening means and fastened thereto. The stiffener member 41 is fastened to the load bearing struts 15 and facilitates bending the opposing flat sheet 19 to form an effective curved airfoil shape. The opposing flat sheet 19 is symmetrical to the opposing flat sheet 17.

Figure 5:
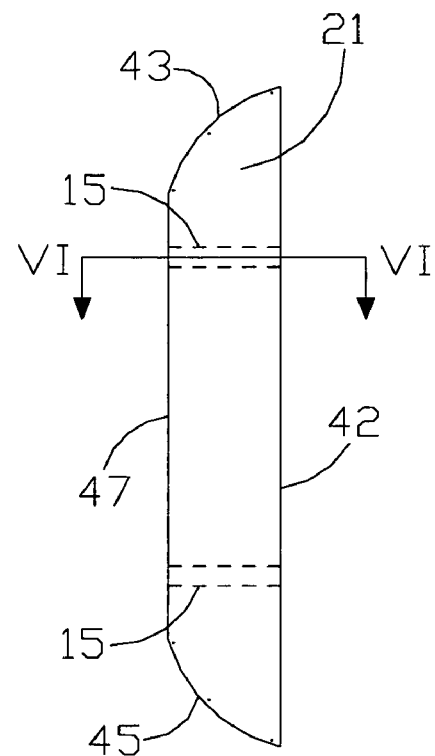
FIG. 5 is a plan view of the top flat sheet bent to form an effective curved airfoil.
Figure 6:
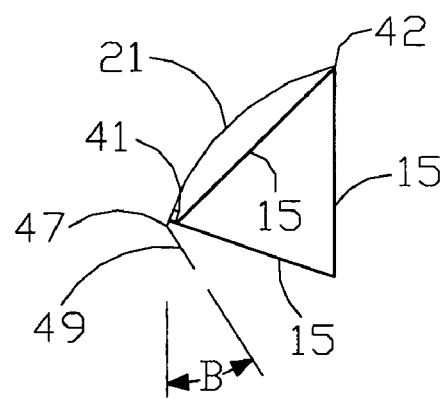
FIG. 6 is a sectional view taken on line VI—VI of FIG. 5.

FIGS. 5 and 6 show the top flat sheet 21 of pliable material bent to form an effective curved airfoil shape. The top flat sheet 21 has a top outside edge portion 42 which is bent at an angle generally about 72° to facilitate fastening the top flat sheet 21 to the top member 10 of the frame 7 and is disposed adjacent the top edge of the flat front face 3. Side edges 43 and 45 have predetermined side curves which mate, respectively, with the curved upper edges of the opposing flat sheets 17 and 19 when the opposing flat sheets 17 and 19 and top flat sheet 21 are bent to form effective curved airfoils. The bottom edge 47 of top flat sheet 21 is bent inwardly to an angle B to form the angled flap 49. Angle B is generally about 35°. The angled flap 49 is preferably not removably fastened to top sheet 21, but could be.

Figure 7:
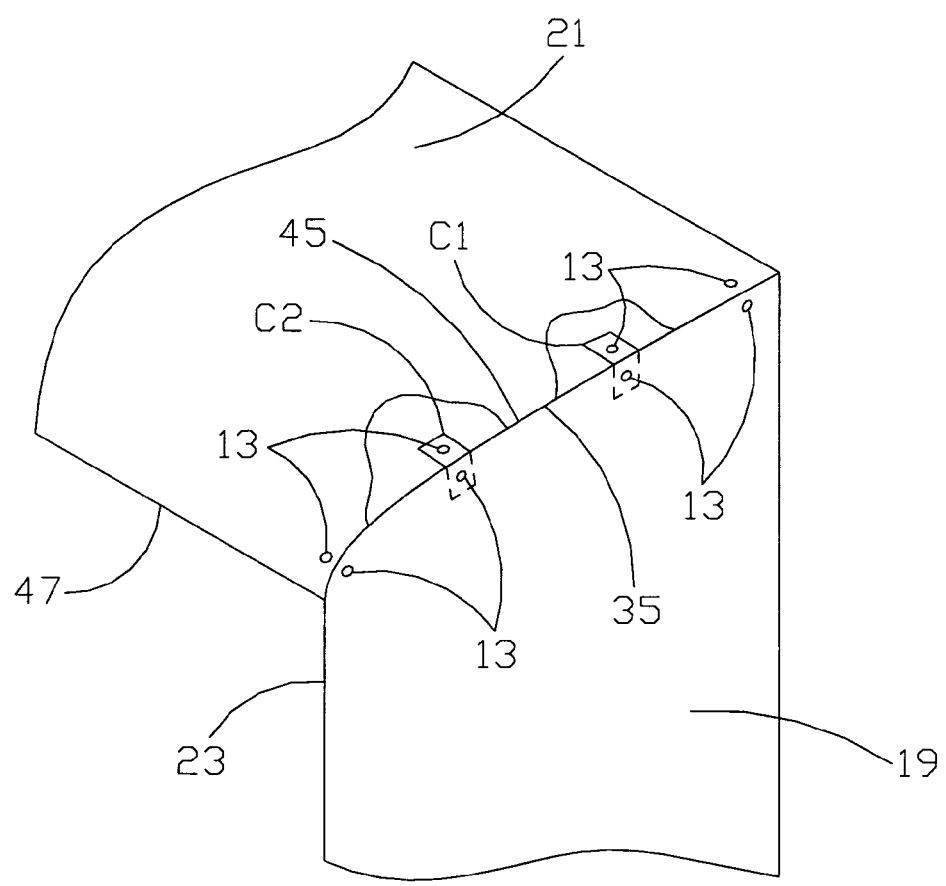
FIG. 7 is a partial isometric view showing a mating edge of the top flat sheet and an opposing flat sheet and typical joining clips.

FIG. 7 shows the mating juncture of the top flat sheet 21 and the opposing flat sheet 19 and typical installation of the clips C1, and C2, which cooperate with the predetermined curved upper edge 35 of the opposing flat sheet 19, and the curved side edge 45 of the top flat sheet 21, to facilitate bending the top flat sheet 21 to form an effective curved airfoil shape and secure it in place. While only two clips C1 and C2 are shown to fasten the top flat sheet 21 to the opposing flat sheet 19, it is understood that any number of clips could be utilized. The mating juncture of the top flat sheet 21 and the opposing flat sheet 19 is symmetrical to the mating juncture of the top flat sheet 21 and the opposing flat sheet 17.

Figure 8:
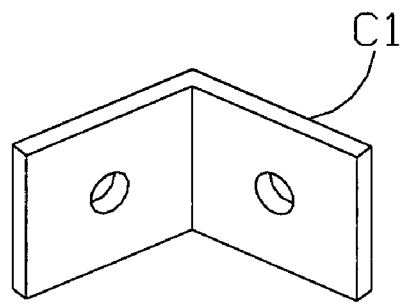
FIG. 8 is an isometric view of a joining clip.
Figure 9:
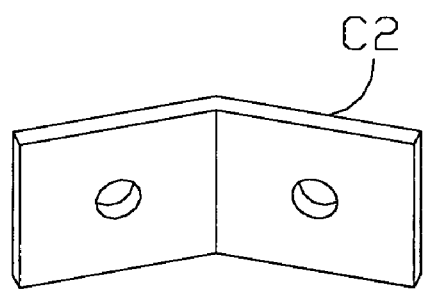
FIG. 9 is an isometric view of a joining clip bent at a greater angle.

FIGS. 8 and 9 show clips C1, and C2, respectively. Clip C1 is bent to form an angle of about 100°. Clip C2 is bent to form a larger angle of about 130°. Each of these clips is utilized to fasten the top sheet 21 to each of the opposing sheets 17 and 19 adjacent the mating curved edges.

Figure 10:
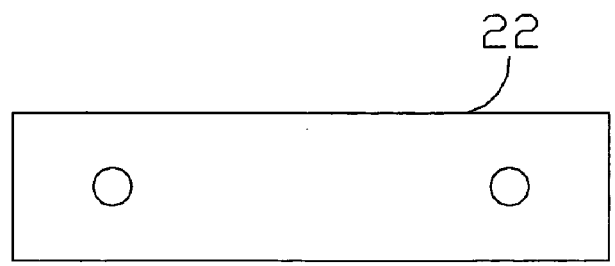
FIG. 10 is a plan view of a spacer.

FIG. 10 shows the spacers 22 fastened between the cross members 11 and the flat front face 3 of the vehicle 1. The spacers 22 allow the frame 7 to be mounted over slight irregularities on the flat front face 3 of the vehicle 1.

While the preferred embodiments described herein set forth the best mode to practice this invention presently contemplated by the inventor, numerous modifications and adaptations of this invention will be apparent to others of ordinary skill in the art. Therefore, the embodiments are to be considered as illustrative and exemplary and it is understood that the claims are intended to cover such modifications and adaptations as they are considered to be within the spirit and scope of this invention.

INDUSTRIAL APPLICABILITY

An aerodynamic reducing device 5 for a vehicle 1 as set forth in this invention provides a device 5, which is economical to manufacture and to maintain, and is easily packaged, transported, and installed in the field on rectangular shaped vehicles of varying geometry. It provides a set of three curved airfoil portions that will substantially reduce the aerodynamic resistance of the vehicle 1 when moving, thus reducing fuel consumption, fuel cost and air pollution.

What is claimed is:

1. A device for reducing vehicle aerodynamic resistance disposed on a flat front face of the vehicle, the device comprising: a plurality of parallel members fastened to the flat front face so as to extend between opposite sides thereof; a plurality of load bearing struts of a predetermined size attached to the parallel members; a pair of opposing sheets of flat pliable material each having an outside edge portion attached to the parallel members adjacent the opposite sides of the flat face, an inside edge portion attached to adjacent struts and a predetermined curved upper edge; a single top sheet of flat pliable material having an outside edge portion disposed generally parallel to and adjacent the top of the flat front face, an inside edge portion attached to adjacent struts and predetermined curved side edges; Whereby the opposing sheets and top sheet bend and mate the curved upper edges of the opposing sheets to the curved side edges of the top sheet to form curved airfoil shapes to reduce the aerodynamic resistance of the vehicle when moving.

2. A device as set forth in claim 1, wherein the outside edge portion of the top sheet is attached to the flat front face.

3. A device as set forth in claim 1, wherein the side edges of the top sheet are attached to the opposing sheets.

4. A device as set forth in claim 1, wherein the inside edge portion of each opposing sheet is stiffened and fastened to the struts.

5. A device as set forth in claim 1, wherein a stiffening member is fastened adjacent the inside edge portion of each opposing sheet and the struts are fastened to the stiffening members.

6. A device as set forth in claim 1, wherein the outside edge portion of each flat sheet is prebent adjacent to the flat front face.

7. A device as set forth in claim 6, wherein the outside edge portion of each sheet is prebent to approximately 72°.

8. A device as set forth in claim 1, wherein load the bearing struts are fastened to the parallel members.

9. A device as set forth in claim 1, wherein the sheets are made of aluminum.

10. A device as set forth in claim 8, wherein the sheets are made of aluminum.

11. A device as set forth in claim 10, wherein rivets provide the fastening.

12. A device for reducing vehicle aerodynamic resistance disposed on a flat front face of the vehicle, the device comprising: a plurality of load bearing struts of a predetermined size attached to the flat front face adjacent opposite sides thereof; a pair of opposing sheets of flat pliable material each having an outside edge portion attached to the opposite sides of the flat front face, an inside edge portion attached to adjacent struts and a predetermined curved upper edge; a single top sheet of flat pliable material with predetermined curved side edges and a top outside edge portion disposed generally parallel to and adjacent a top of the flat front face; and a plurality of clips for fastening and mating the curved upper edges of the opposing sheets to the curved side edges of the top sheet; whereby the opposing sheets and top sheet bend into curved airfoil shapes to reduce the aerodynamic resistance of the vehicle when moving.

* * * * *